F. Fredley,
Cider Mill.
Nº 875.  Patented Aug. 3, 1838.
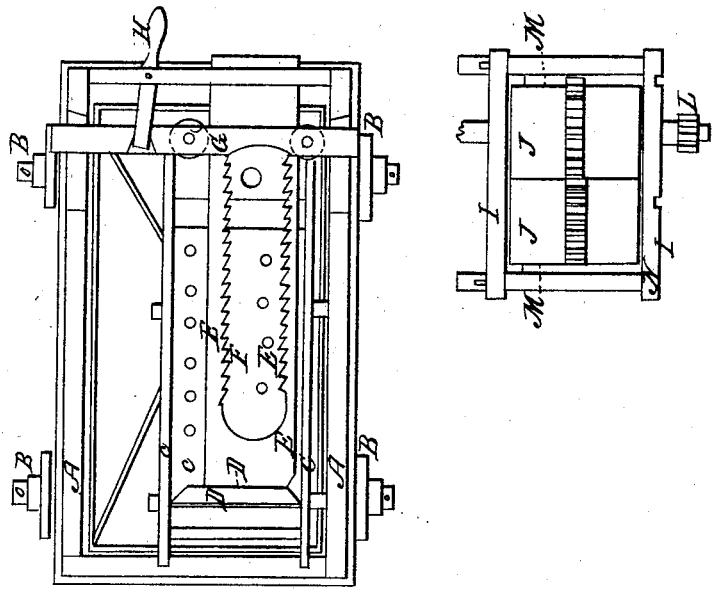
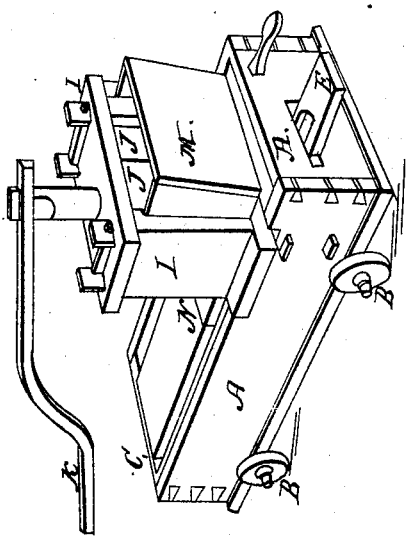

UNITED STATES PATENT OFFICE.

FREDERICK FREDLY, OF SUGAR VALLEY, PENNSYLVANIA.

PORTABLE CIDER MILL AND PRESS.

Specification of Letters Patent No. 875, dated August 3, 1838.

*To all whom it may concern:*

Be it known that I, FREDERICK FREDLY, of Sugar Valley P. O., Logan township, Center county, State of Pennsylvania, have invented a new and useful Machine for Making Cider, called "Fredly's Portable Cider-Mill," which is described as follows, reference being had to the annexed drawings of the same, making part of this specification.

This machine consists of a rectangular body or box A, of suitable length, breadth, and depth, supported upon four wheels or trucks B by which it is moved from place to place and the mill thus rendered portable. This is called the cider box. Within this box, A, is placed another box C (called the pressing box) about the length of the former inside and about half its width, having its sides, ends, and bottom perforated with small holes, flaring outwardly, through which the cider runs. In this box the pummice is received and pressed. And in it moves backward and forward a follower or presser D for pressing the pummice against the end of said inner box and expressing the cider therefrom; said follower having a broad flat stem or handle E a little longer than the box, cut out on the inside into an oblong space with rounded ends—the sides being cogged at F F. The end of the stem, opposite to that on which the follower is fastened, is let into a sliding cross head G made to move to the right and left by means of a lever H turning on a pin as its fulcrum inserted into the end of the box.

Upon the top of the cider box A at the forward end is raised a stout frame I, in which the gudgeons of two parallel vertical rollers J J, turn for mashing the apples into pummice between them as they revolve almost against each other. They are turned by means of a sweep K fastened to the upper gudgeon of one of the rollers, to which sweep a horse is hitched who travels around the machine in a circle, and the rollers are made to move together toward each other by having a circular row of mortises made around one of the rollers into which a corresponding rows of cogs on the other roller mash. On the lower gudgeon of the last mentioned roller is fixed a horizontal cog wheel L which mashes into the racks of the stem alternately for moving the follower in or out—the shifting of the racks to produce this alternate motion being performed by means of the lever and sliding cross head into which the end of the rack-stem is inserted.

In front of the mashing rollers is placed an upright hopper M to receive the apples and conduct them between the rollers to be mashed into pummice. Over part of the pressing box is placed a platform N for conveying the pummice to said box in advance of the follower. The other part of the pressing box is also covered with a board during the operation of pressing, but which is removed when the box is to be cleaned.

The bottom of the cider box is cut into channels leading to an apperture near one corner of said outer or cider box through which the cider is conducted to a proper receiver.

Operation: The machine being drawn to the orchard, or wherever it is to be used, the horse is attached to the sweep,—the hopper filled with apples, and the follower drawn back. The horse is driven around which turns the rollers toward each other and crushes the apples between them and thus converts them into pummice, which is delivered upon the platform and by it conveyed into the pressing box in the space between its hinder end and the follower. When a sufficient quantity is thus placed one side of the double rack is put into gear with the pinion on the end of the roller to which the sweep is attached which causes the follower to move toward the outer end of the pressing box carrying with it the pummice which it presses against said end of the box—the cider expressed therefrom running through the apertures into the outer or cider box from which it is conducted by the channels to the common opening at the bottom through which it passes to the receiver.

To draw back the follower for another supply of pummice the other side of the rack is put into gear with the pinion by moving the lever which shifts a movable cross head and when thus in gear and the horse moving around in the same direction as before the follower recedes from the end of the box until the semi-circular end of the mortise or opening of the stem arrives at the pinion when it stops, as this end, as well as the opposite semi-circular end, is not cogged. The top is removed and the pummice thus pressed is thrown out with a shovel. Another supply is then put in and the operation repeated.

The invention claimed and desired to be secured by Letters Patent consists—

In the mode of operating the press by means of the double rack combined with the slide for throwing it in and out of gear; and also, the combination of the machine for mashing or reducing apples with the press in the manner described, that is by attaching the pinion, which works the rack of the press, on the axis of one of the rollers of the reducing or mashing machine.

FREDERICK FREDLY.

Witnesses:
WM. P. ELLIOT,
EDMUND MAHER.